(12) United States Patent
Colea

(10) Patent No.: US 6,777,104 B2
(45) Date of Patent: Aug. 17, 2004

(54) SUBSURFACE ENGRAVING OF THREE-DIMENSIONAL SCULPTURE

(75) Inventor: Ovidiu Colea, Glen Cove, NY (US)

(73) Assignee: Colbar Art, Inc., Long Island City, NY (US)

( * ) Notice: Subject to any disclaimer, the term of this patent is extended or adjusted under 35 U.S.C. 154(b) by 0 days.

(21) Appl. No.: 10/298,788

(22) Filed: Nov. 18, 2002

(65) Prior Publication Data

US 2003/0068468 A1 Apr. 10, 2003

Related U.S. Application Data

(62) Division of application No. 09/645,124, filed on Aug. 24, 2000, now Pat. No. 6,537,479.

(51) Int. Cl.$^7$ ................................................ A47G 35/00
(52) U.S. Cl. ...................... 428/542.2; 264/482; 428/13
(58) Field of Search .............................. 428/542.2, 13; 264/400, 482, 40.7; 219/121.61, 121.68, 121.73, 121.75, 121.82, 121.85

(56) References Cited

U.S. PATENT DOCUMENTS

| | | |
|---|---|---|
| 4,092,518 A | 5/1978 | Merard |
| 4,187,265 A | 2/1980 | Fischler |
| 4,752,498 A | 6/1988 | Fudim |
| 4,919,850 A | 4/1990 | Blum et al. |
| 4,927,686 A | 5/1990 | Colea |
| 4,983,335 A | 1/1991 | Matsuo et al. |
| 5,575,936 A | 11/1996 | Goldfarb |
| 5,637,169 A | 6/1997 | Hull et al. |
| 5,637,244 A | 6/1997 | Erokhin |
| 5,783,136 A | 7/1998 | Enke |
| 5,886,318 A | 3/1999 | Vasiliev et al. |
| 5,968,441 A | 10/1999 | Seki |
| 6,087,617 A | 7/2000 | Troitski et al. |
| 6,133,336 A | 10/2000 | Popat et al. |
| 6,333,486 B1 | 12/2001 | Troitski |

*Primary Examiner*—Arden B. Sperty
(74) *Attorney, Agent, or Firm*—Katten Muchin Zavis Rosenman

(57) ABSTRACT

A matrix is formed into a desired shape by pouring transparent liquid material into a mold. The material progresses from the liquid to the gelatinous state. Laser sculpting steps are performed when the material is still in a gelatinous condition to form small spots in the matrix. Because the material is non-solid gel when the laser beam applies its focused energy, there is no cracking or destruction. Intensity and duration of the laser pulse determine the size of the spots as does the timing in relation to the matrix material finally changing from gel to solid. Particular visual effects are produced at different degrees of solidity when sculpting. The liquid in the mold may be pressurized for removal of air bubbles after initial pouring of the matrix material and application of pressure after the laser sculpting controls the size of the spots in the finished product.

13 Claims, 5 Drawing Sheets

SUBSURFACE ENGRAVING OF THREE-DIMENSIONAL SCULPTURE

CROSS REFERENCE TO RELATED APPLICATIONS

This is a division of U.S. application Ser. No. 09/645,124 filed Aug. 24, 2000, now U.S. Pat. No. 6,537,479.

BACKGROUND OF THE INVENTION

This invention relates to the creation of a sculpture generated by a laser beam directed at a transparent matrix, and more particularly, to a sculpture engraved within the surfaces of a transparent matrix.

There are many souvenirs and art objects wherein a translucent ghost-like image in two or three dimensions is seen floating within a solid piece of clear plastic or glass.

In recent years these translucent objects have been produced internally using a programmed laser that is brought to focus sequentially at many locations within the transparent matrix. The energy concentrated at the point of focus changes the matrix material so that the translucent three-dimensional object is created of many spots within the transparent plastic or glass matrix.

XYZ axis programming in positioning the matrix relative to the laser source provides enough spots (dots) within the matrix to define a desired image. Size of the spots can be controlled by controlling the energy and duration of the laser beam, and the size of the internal sculpture can be varied by setting the controls on the computer program.

The concentrated laser beam forms tiny cracks, that is, a destruction, in the matrix material at the point of beam focus and this cracking or other destruction provides the translucent regions which taken together create the sculpted shape. The amount of cracking or other distortion within the matrix is determined by the intensity and duration and type of the laser beam. In U.S. Pat. No. 5,575,936, the action of the laser beam is described as "local destruction" or "local disruption". In U.S. Pat. No. 5,886,318, the inventor describes a laser spot with a power density exceeding ten times the destruction threshold of the glass object under processing. At column 1, U.S. Pat. No. 5,637,244 speaks of "macro-destructions". In the '244 invention, the techniques were improved to provide "microdestructions" adjustable in size. Clearly in the prior art, there is a degree of cracking/destruction at the point of concentration of the laser beam.

However, a problem arises when the laser spots/dots/cracks/destructions, etc. are too close together or too near the external surfaces of the matrix. Then, a defect in the internal sculpture results or subsequent changes with time may render the sculpture valueless. This internal damaging of the material limits the closeness of the dots that are generally formed in the prior art as well as their location relative to the outer surfaces of the matrix. The quality of the internal sculpture is adversely affected.

What is needed is a method of producing subsurface three dimensional sculpture by laser engraving that does not crack or destroy the matrix material in order to form the sculpture, thereby permitting a finer sculpture with closer "dots" and an ability to locate the internal sculpture at or near external surfaces of the matrix without later changes or interactions.

SUMMARY OF THE INVENTION

In accordance with the invention an improved sculpturing procedure results in an improved product. In such subsurface sculpting, clear materials, whether glass or plastic, are generally used as the matrix materials. These matrix materials may be in three states, namely, liquid, gelatinous, and solid. In the prior art, the laser sculpting has been done in solid material. The matrix is formed into the desired shape by pouring liquid material into a mold that has been prepared, for example, in special instances, by an artist. With time, the material progresses from the liquid state to the gelatinous state and finally to the solid state. Thereafter, laser sculpting commences in the known manner.

In accordance with the present invention, the laser sculpting steps are performed when the matrix material is still in a gelatinous condition. As a result, small spots, dots or bubbles are formed, which are tiny, and because the material is a non-solid gel when the laser beam applies its focused energy, there is no cracking or destruction. What the actual process in formation of the spots/dots/bubbles is, is not precisely known. It is not known whether the matrix material locally evaporates, for example, or perhaps the dots/bubbles are the result of some chemical process that occurs by the application of high intensity thermal energy. However, it has been found possible to link dot to dot and even draw continuous lines with the laser beam. This is not possible in the prior art where the material is cracked/destroyed, as the thermal energy is applied to a solid. Intensity and duration of the laser pulse in the present invention determine the size of the dots/bubbles that are produced as does the timing in relation to the matrix material finally changing from gel to solid. All of the possible conditions between the liquid state and the solid state for the matrix material have not yet been explored in actual sculpting. Particular visual effects can be expected at different degrees of solidity when sculpting.

Thus, there is a wide range of control of the internal sculpture that is produced. Additionally, sculpting can be performed on the external surfaces of the matrix as well as close to these external surfaces without cracking/destruction. Spacing between dots and lines allow for the production of a three-dimensional-translucent, see-through sculpture, floating ghost-like in a clear matrix. The matrix material may be colorless or tinted so long as it remains sufficiently clear to permit the laser beam penetration from its external position.

The liquid in the mold may be pressurized for removal of air bubbles after initial pouring of the matrix material into the mold, and application of pressure on an exposed surface of the matrix after the laser sculpting can be used to control the size of the dots/bubbles that result in the finished product.

Because the sculpting is performed on a matrix in a semi-solid, that is, somewhat gelatinous state, there is no cracking of the matrix material, and a finer detailing of the finished sculpture is possible.

Accordingly, it is an object of the invention to provide an improved method for subsurface engraving of a three-dimensional sculpture within a transparent matrix.

Another object of the invention is to provide an improved method for subsurface engraving three-dimensional sculpture within a transparent matrix wherein dots/bubbles may be joined one to the other, or in a continuous line.

Yet another object of the invention is to provide an improved subsurface engraving of a three-dimensional sculpture in a transparent matrix wherein the sculpture is both on the surface of the matrix and within the matrix.

Still another object of the invention is to provide an improved subsurface engraving of a three-dimensional sculpture within a transparent matrix, wherein the sculpture is close to an external surface of the matrix.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

Still other objects and advantages of the invention will be apparent from the specification.

BRIEF DESCRIPTION OF THE DRAWINGS

For a full understanding of the invention, reference is had to the following description taken in connection with the accompanying drawings, in which.

DESCRIPTION OF PREFERRED EMBODIMENTS

Figure 4:
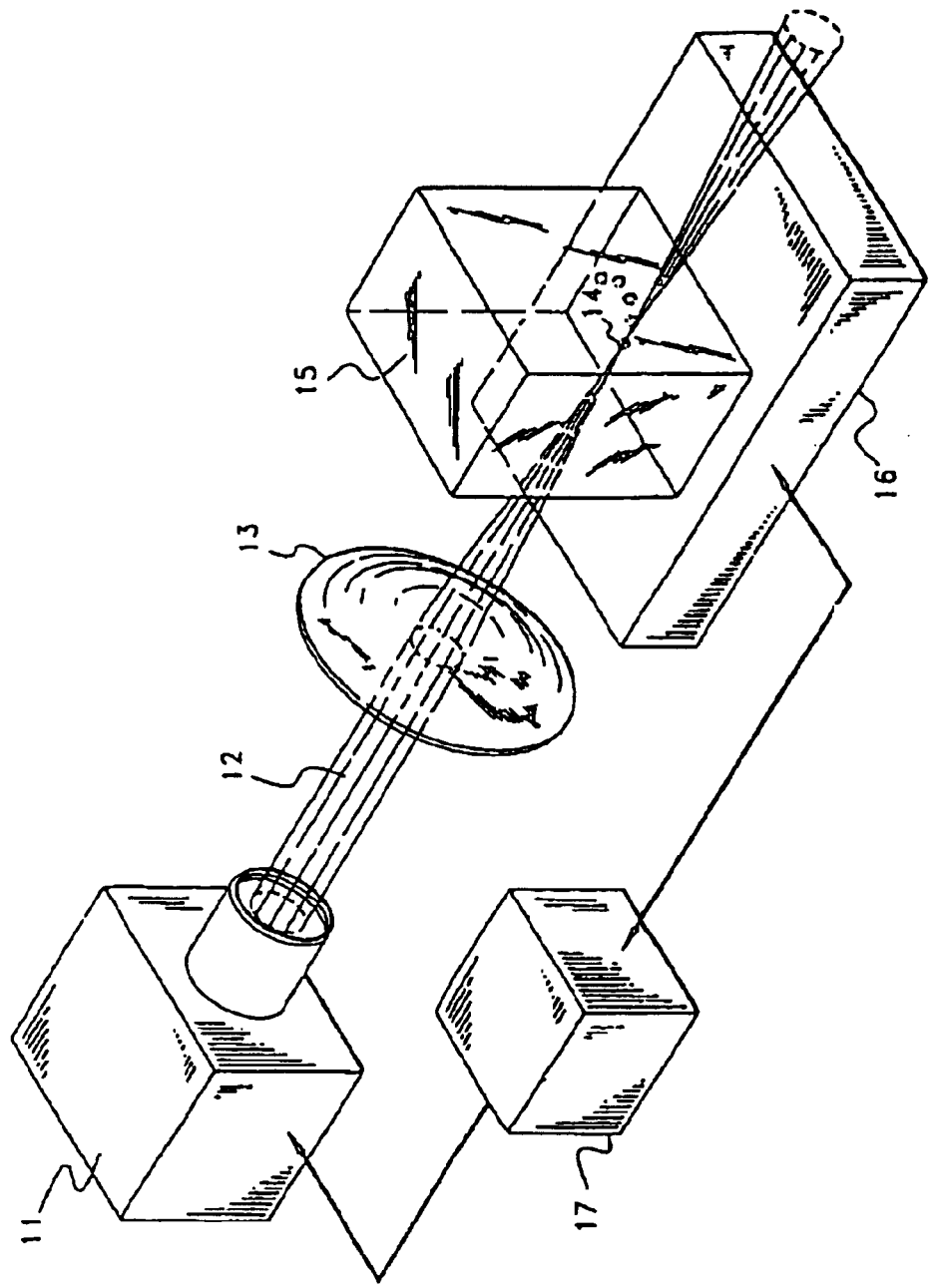
FIG. 4 is a schematic diagram illustrating an apparatus for a known technique of three-dimensional sculpturing within a solid transparent matrix.

FIG. 4, taken from U.S. Pat. No. 5,575,936, mentioned above and incorporated herein by reference, illustrates a basic method of subsurface engraving in a solid transparent matrix. Fractures are produced in the matrix 15 by a laser beam 12 that is focused within the matrix 15 by a lens 13. The solid matrix 15 is positioned on a movable platform 16 which is moved under direction of the controller 17. Thus the laser 11 can produce a plurality of destructions/disruptions at the focal point 14 which is moved within the matrix 15 from dot to dot.

Refinements in this procedure are added in the other patents mentioned above, which are also incorporated herein by reference. The laser may be pulsed or operate steady state while the focal point location is changed to produce a plurality of dots. Procedures for operation of the laser apparatus itself and its control are not a novel portion of the present invention and accordingly, are not discussed in detail herein.

Figure 6:
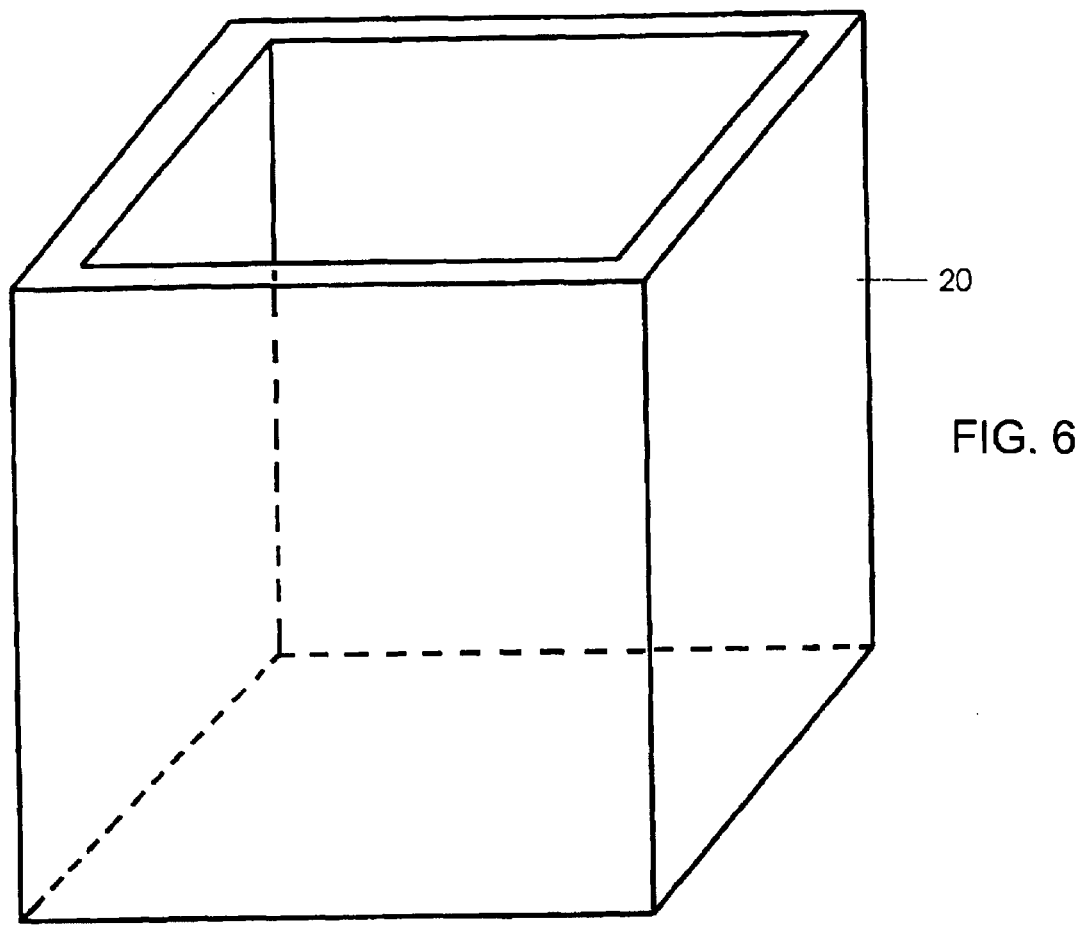
FIG. 6 is an exemplary rectangular mold for use in the method in accordance with the invention.

In the present invention, a design mold (FIG. 6) is provided having one or more flat transparent windows through which an externally located laser beam can be directed into the cavity of the design mold. The design mold 20 may be, for example, a simple structure similar to a fish tank or it may be, for example, of a design created by an artist such that the matrix which is produced is in itself an object of art, that is, a sculpture. The design mold has an opening at the top, which allows venting and filling with matrix material.

The matrix material is poured into the mold to fill the mold to the desired level. The material is poured slowly so as to avoid entrapment of tiny air bubbles in the matrix material. The matrix material may be a single component or may contain two or more components in a mixture. Materials used for this matrix's include transparent acrylic resin, polyester resin, polyurethane, and glass. Each of these is a three-staged material which can be mixed and poured into the mold and will go from a liquid state to a gelatinous state and finally to a solid state with the passage of time and/or application of heat.

It should be noted that if, in pouring the liquid matrix material into the mold, air bubbles are formed, then the entire mold may be placed into an autoclave for a few minutes to remove the bubbles by application of pressure, for example, up to approximately 125 PSIG. This causes the bubbles to rapidly rise to the surface and escape. Then the mold with bubble-free matrix material in the liquid state is removed from the autoclave. This bubble removal must generally be completed before the matrix material begins to gel.

After a specific period of time, the liquid matrix materials poured inside the mold begin to enter the second physical stage, that is, the liquid begins to gel. At a selected time, the entire mold, together with the gelling mixture is placed on the engraving machine, for example, as illustrated in FIG. 4 and as described in the above mentioned patents. The desired sculpture is created by passage of the controlled laser beam through the flat transparent windows provided in the mold. The beam focuses in the gel matrix to produce the desired lines and dots. In accordance with the present method of engraving in gelatinous materials, dots/bubbles are formed without destruction/cracking of the matrix material.

After the sculpting is completed, the mold together with sculptured matrix are removed from the laser apparatus and left to further cure and harden toward the solid state.

On the other hand, after the sculpting is complete, the mold with the sculpting material can again be placed into the autoclave where pressure may be applied and the temperature may be increased for fast curing. Application of pressure controls the size of the bubble created by the engraving process. Increasing the pressure reduces the size of the dots/bubbles.

After the sculptured matrix material has sufficiently solidified the mold is removed. The final product may be slightly resilient or rigid. For original or expensive items created by a well-known artist, the artist may want to specially finish the external surfaces of the art object which has been created. On the other hand, lower cost souvenir objects may be simple shapes made in simple molds.

During the process of subsurface engraving, because the engraving is done while the matrix material is in a gelatinous state, the laser beam creates a tiny bubble, which nevertheless may be specified as small, medium or large from a production viewpoint, while still actually "tiny". This size is controlled based upon the power and time of application of the focused laser beam. The matrix material is not damaged in the present procedure by tiny cracks or destructions as are produced on a hard material such as when engraving solid glass or plastic. A continuous line will be drawn by a dot to dot attachment of dots/bubbles or a continuous line can be generated with the present invention by continuous relative motion between the matrix material and focal point of the laser beam without fear that the material will crack.

Two and three-dimensional subsurface engravings have been formed using a RSY OSC diode pump Nd-Yag diode engraver, manufactured by Rofin-Sinar Laser Corporation, and controlled by VitroCam computer aide software, which are commercially available.

The matrix material need not be colorless but must be transparent to the laser beam when in a semi-solid gelatinous state. The present method produces a finer product and allows an artist to control the quality and intensity of the created image. For the first time, the gelatinous state of the material permits use of the subsurface engraver to create a continuous drawing image by either a dot by dot technique or by continuous lines. The gelatinous state of material allows sculpting of larger images within a matrix and closer to the exterior of the mold, without cracking or damaging the matrix material.

Figure 5:
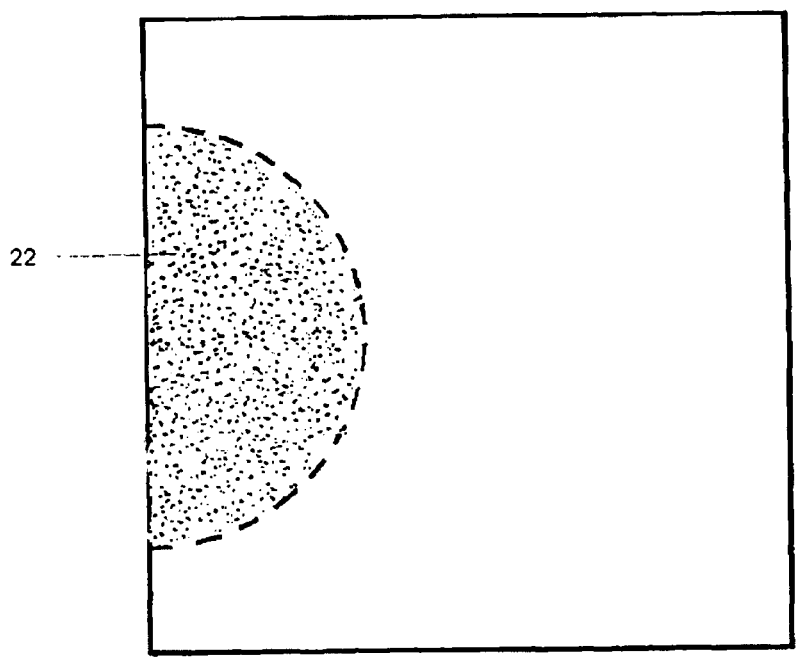
FIG. 5 is a side elevation of an object comprising a subsurface hemispheric engraving that extends to an external surface of the transparent matrix.

Because of the gelatinous state of the matrix material, it is possible to produce a sculptured image beginning outside at the matrix surface and continuing to the inside of the matrix without damaging the piece (FIG. 5). FIG. 5 illustrates a hemisphere 22 sculpted in dots. The hemisphere is visible from every face of the object and may be made to appear, for example, solid, or hollow like a tennis ball that is sliced in half, depending on the program that controls the laser beam.

It should be understood that whereas the method described above begins with filling a mold with liquid matrix material, it is also possible to practice the method by beginning with a solid matrix which is heated until the matrix material enters a gelatinous state. Then, the gelled matrix may be sculptured as described above. Following sculpturing the matrix material is allowed to harden. The final product may be slightly resilient or rigid. This alternative procedure is only effective on a thermoplastic plastic matrix, and may also be used with glass.

Figure 1:
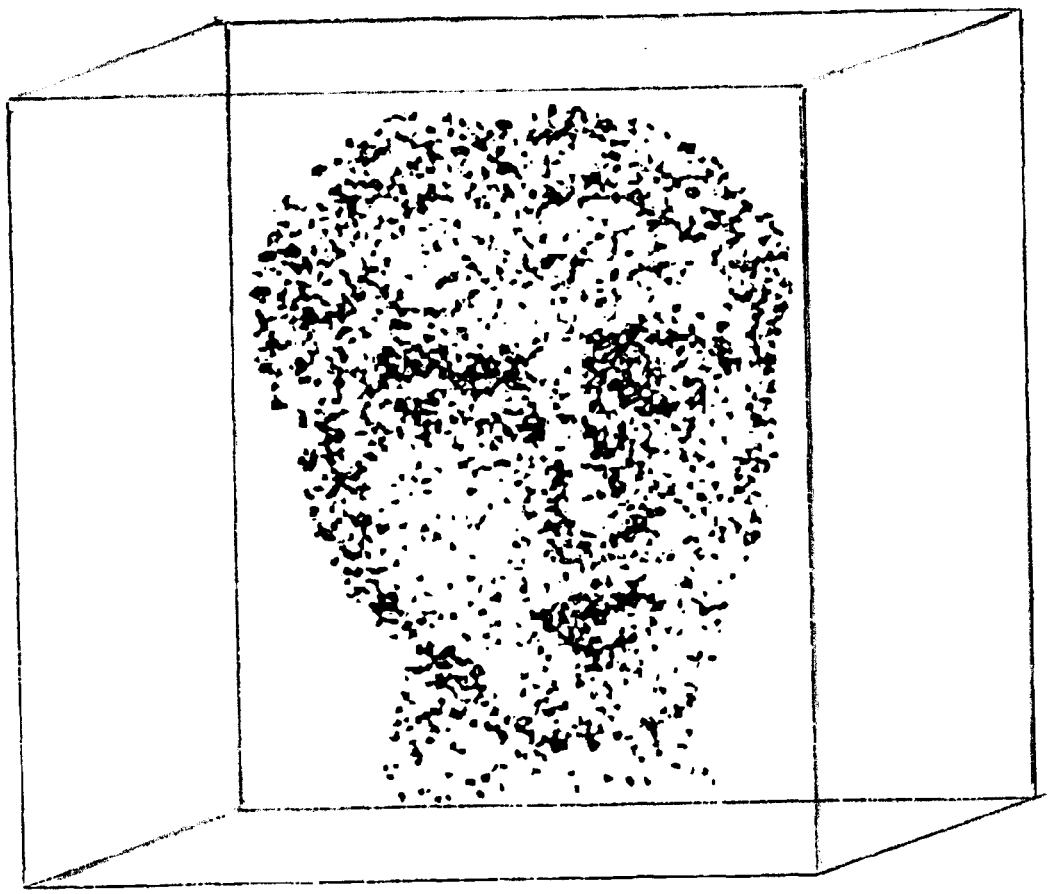
FIG. 1 is a three-dimensional sculpture engraved in a solid matrix of acrylic by a focused laser beam in accordance with the prior art.
Figure 2:
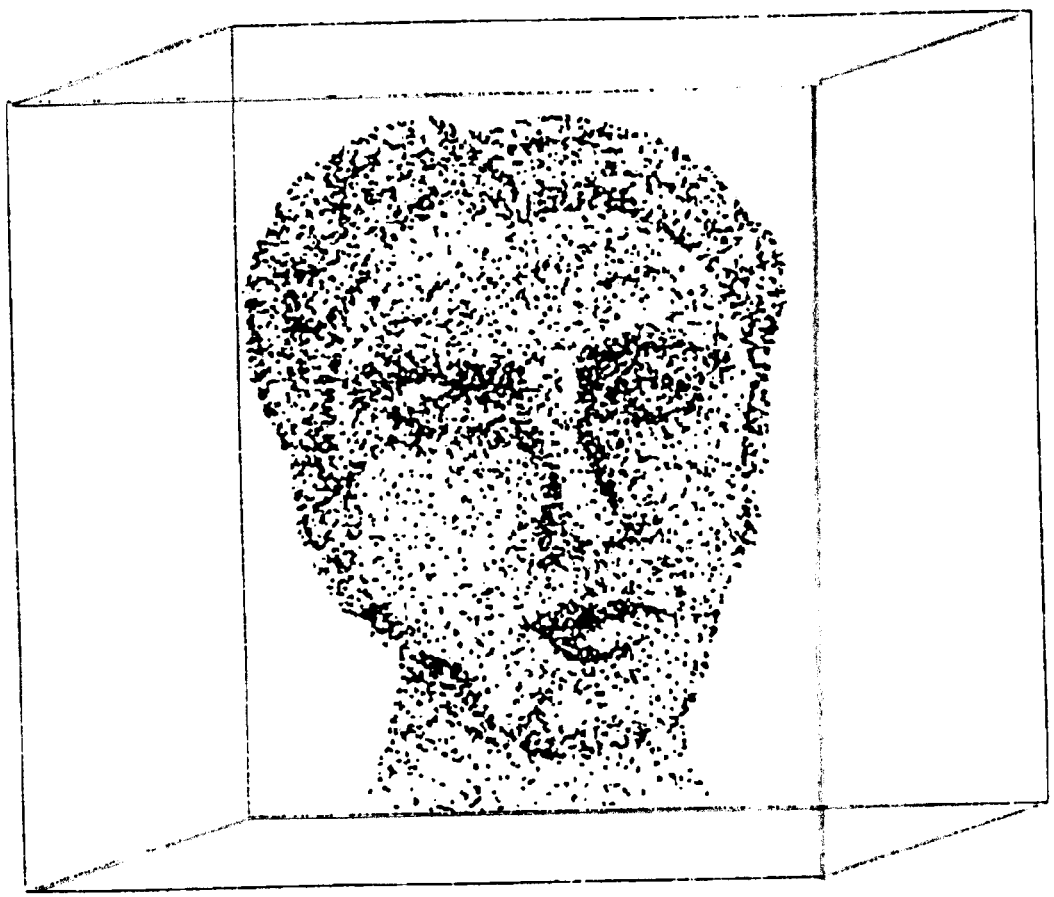
FIG. 2 is similar to FIG. 1 illustrating a prior art engraving of a sculpture in a solid glass matrix.
Figure 3:
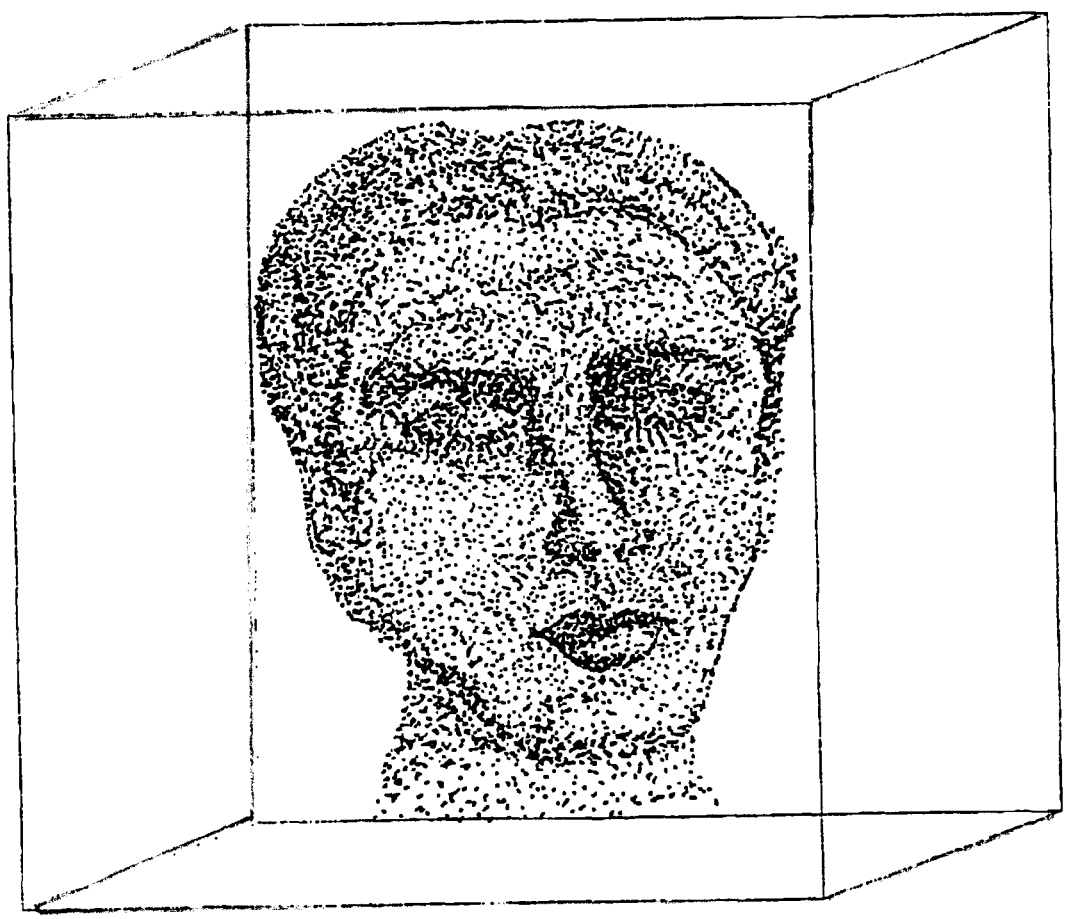
FIG. 3 is a three-dimensional sculpture in accordance with the invention that was engraved by a laser beam while the matrix material was in a gelatinous state.

As illustrated in FIGS. 1–3, the difference in quality between the sculptures produced by the present method (FIG. 3) and the destructive prior art techniques is noticeable in the finished product.

It should also be understood that the method, in accordance with the invention, can be used to produce objects that are not limited to those of ornamental value. For example, the techniques in accordance with the invention can be used to form reticles, and be used in photographic lens systems, gunsights, instruments including optical systems, and the like. The engraving may be on one or both of internal and external surfaces of the object.

The molds can be made with windows of any suitable transparent material including silicones. The matrix material may be tinted so long as it remains transparent to the externally applied laser beam that is focused within the matrix material.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An object having an engraved subsurface image, comprising:
   (a) a matrix material that is transparent to a laser beam, said matrix material being in a physical gel state that is between a rigid state and a flowable state;
   (b) at least one modified portion produced in said matrix material by a laser beam directed towards said matrix material at a point of focus of said laser beam;
   (c) said at least one modified portion being visible and appearing as a bubble from outside said matrix material, and
   (d) said at least one modified portion being generated without destruction or cracking of said matrix material.

2. An object in accordance with claim 1, wherein said transparent matrix material is one of colorless and tinted.

3. An object in accordance with claim 1, wherein said at least one modified portion remains in said matrix material upon the hardening of said matrix material from a gel state to a hardened state.

4. An object in accordance with claim 3, wherein said matrix material is initially provided in a rigid state and is changed to said physical gel state by heating of said matrix material.

5. An object in accordance with claim 1, wherein said matrix material is one of glass and a thermoplastic material.

6. An object in accordance with claim 1, further comprising a plurality of modified portions produced by said laser beam, said point of focus being moved relative to said matrix material in accordance with a controlled computer program, whereby an engraving of said matrix material in two or three dimensions is made visible when looking at said matrix material from its exterior.

7. An object in accordance with claim 1, wherein said at least one modified portion is formed in said matrix material by focused thermal energy of said laser beam.

8. An object in accordance with claim 6, wherein said modified portions being respectively at least one of (a) connected dot to dot to other said modified portions, (b) in a continuous line, and (c) separate and individual dots.

9. An object in accordance with claim 6, wherein said engraving is formed on and extends from an outer surface of said matrix material into an interior volume of said matrix material.

10. An object in accordance with claim 3, wherein the size of said at least one modified portion is varied by pressurizing said matrix material prior to the hardening of said matrix material from said physical gel state to said hardened state.

11. An object having an engraved subsurface image, comprising:
   (a) a mold having a portion that is transparent to a laser beam;
   (b) a matrix material provided in said mold, said matrix material being transparent to a laser beam, said matrix material being initially in a physical gel state that is between a rigid state and a flowable state;
   (c) at least one modified portion produced in said matrix material by a laser beam directed towards said matrix material at a point of focus of said laser beam while said matrix material is in said physical gel state; wherein said matrix material hardens into a rigid state following formation of a midified portion;
   (d) said at least one modified portion being visible and appearing as a bubble from outside said matrix material when said matrix material is in both said physical gel and rigid states, and
   (e) said at least one modified portion being generated without destruction or cracking of said matrix material when said matrix material is in both said physical gel and rigid states.

12. A system for subsurface engraving comprising:
(a) a matrix material that is transparent to a laser beam, said matrix material being in a physical gel state that is between a rigid state and a flowable state;
(b) means for producing at least one modified portion within said matrix material without destruction or cracking of said matrix material, and
(c) said at least one modified portion being visible and appearing as a bubble from outside said matrix material,
(d) wherein said means further comprises subjecting said matrix material in said gel state to a laser beam directed towards said matrix material to produce at least one modified portion within said matrix material at a point of focus of said laser beam.

13. The system in accordance with claim 12, further comprising control means for producing a plurality of modified portions produced by said laser beam, wherein said control means moves said point of focus of said laser beam relative to said matrix material, whereby an engraving of said matrix material in two or three dimensions is made visible when looking at said matrix material from its exterior.

* * * * *